United States Patent [19]

Doetsch et al.

[11] 4,427,644
[45] Jan. 24, 1984

[54] PROCESS FOR THE PREPARATION OF BIVALENT METAL PEROXIDES

[75] Inventors: Werner Doetsch, Bad Hoenningen; Helmut Dillenburg, Rheinbrohl; Paul-Wilhelm Fuchs, Bad Hoenningen; Helmut Honig, Gelting, all of Fed. Rep. of Germany

[73] Assignee: Peroxid-Chemie GmbH, Munich, Fed. Rep. of Germany

[21] Appl. No.: 280,811

[22] Filed: Jul. 6, 1981

[30] Foreign Application Priority Data

Jul. 7, 1980 [DE] Fed. Rep. of Germany ....... 3025682

[51] Int. Cl.$^3$ ................................................ C01D 1/02
[52] U.S. Cl. ..................................... 423/582; 423/583
[58] Field of Search ................................ 423/582, 583

[56] References Cited

U.S. PATENT DOCUMENTS

| | | | |
|---|---|---|---|
| 2,415,443 | 2/1947 | Rentschler | 423/583 |
| 2,563,442 | 8/1951 | Wood et al. | 423/582 |
| 3,134,646 | 5/1964 | Bach | 423/582 |
| 3,176,444 | 4/1965 | Kiyonaga | 55/62 |
| 3,430,418 | 3/1969 | Wagner | 55/25 |
| 3,801,706 | 4/1974 | Sack | 423/415 P |
| 3,986,849 | 10/1976 | Fuderer et al. | 55/25 |

FOREIGN PATENT DOCUMENTS

| | | | |
|---|---|---|---|
| 736415 | 6/1966 | Canada | 423/583 |
| 778323 | 2/1968 | Canada | 423/582 |
| 17460 | of 1900 | United Kingdom | 423/583 |
| 898058 | 6/1962 | United Kingdom | 55/62 |
| 367050 | 7/1973 | U.S.S.R. | 423/583 |

OTHER PUBLICATIONS

Schumb, *Hydrogen Peroxide*, Reinhold, N.Y. (1955), pp. 638-653.

Perry, *Chemical Engineers' Handbook*, Third Edition, McGraw-Hill Book Co., Inc. (1950), pp. 834-840, 1119.

*Primary Examiner*—Edward J. Meros
*Assistant Examiner*—Wayne A. Langel
*Attorney, Agent, or Firm*—Schwartz, Jeffery, Schwaab, Mack, Blumenthal & Koch

[57] ABSTRACT

Disclosed is a continuous process for the production of bivalent metal peroxides, comprising the steps of introducing into an intensive mixing apparatus a solid, anhydrous or hydrated oxide or hydroxide of a bivalent metal; simultaneously introducing into the intensive mixing apparatus a solution of hydrogen peroxide, whereby the solid bivalent metal compound and the peroxide are intensively mixed and react to produce a reaction mixture containing bivalent metal peroxide; transporting the reaction mixture directly to a rapid dryer; and rapidly drying the reaction mixture to produce the bivalent metal peroxide in solid form.

17 Claims, No Drawings

PROCESS FOR THE PREPARATION OF BIVALENT METAL PEROXIDES

BACKGROUND OF THE INVENTION

The present invention relates to a process for the preparation of peroxides and more especially to a process for the preparation of bivalent metal peroxides.

Peroxides of bivalent metals are being used increasingly for technological applications. Thus, for example, alkaline earth metal peroxides are used for medical and pharmacological purposes and in cosmetics. Recently, $CaO_2$ has been growing in importance, as it serves to improve the growth of cultivated plants. In sewage treatment, the potential of the slow release of oxygen by peroxide compounds is being utilized. Metal peroxides are also used in the technical fields of vulcanizing and welding.

Peroxides of bivalent metals are generally prepared by producing peroxide-containing reaction mixtures from aqueous solutions or dilute suspensions of their salts, oxides or hydroxides by means of conversion with aqueous hydrogen peroxide solutions, centrifuging or filtering the mixture and drying them on rack or tray drying apparatus. The dry substances are ground and possibly screened in a conventional manner.

A process for the preparation of $CaO_2$ is known from German Offenlegungsschift No. 15 42 642, wherein a highly dilute solution of hydrogen peroxide is reacted with an excess of calcium hydroxide at temperatures below 30° C. to produce calcium peroxide-octahydrate, which then is converted in an additional drying stage into the anhydrous peroxide.

All of these known processes have numerous disadvantages. They are costly, because of the need of separating the mother liquor by centrifuging and the grinding of the product dried on racks or trays. Furthermore, the economy of the process is limited, because significant losses of peroxide are generated by decomposition of hydrogen peroxide as the result of the large volumes of mother liquor caused by the relatively dilute suspensions, and in the drying process, as the result of long retention times.

Furthermore, because of the strong dilution of the reaction mixture, large volumes of water must be transported unnecessarily and they must be removed in an energy-intensive drying stage. In addition, supplemental control devices are required for temperature control as well as additional process stages for the removal of the excess calcium hydroxide. A further disadvantage is a certain lack of homogeneity of the end product, resulting from decomposition during drying and the subsequent grinding process.

SUMMARY OF THE INVENTION

It is therefore an object of the present invention to provide an improved process for the preparation of peroxides. It is a particular object of the invention to provide an improved process for the preparation of peroxides of bivalent metals.

Another object of the invention resides in the provision of a process for the production of bivalent metal peroxides which eliminates the disadvantages of the known processes.

In accomplishing the foregoing objects, there has been provided in accordance with the present invention a continuous process for the production of bivalent metal peroxides, comprising the steps of introducing into an intensive mixing apparatus a solid, anhydrous or hydrated oxide or hydroxide of a bivalent metal; simultaneously introducing into the intensive mixing apparatus a solution of hydrogen peroxide, whereby the solid bivalent metal compound and the peroxide are intensively mixed and react to produce a reaction mixture containing bivalent metal peroxide; transporting the reaction mixture directly to a rapid dryer; and rapidly drying the reaction mixture to produce the bivalent metal peroxide in solid form.

Preferably, the bivalent metal comprises a metal of Group II of the Periodic System, most preferably an alkaline earth metal or zinc. In amother preferred aspect, the average residence time for the reactants between entry into the intensive mixing apparatus and entry into the rapid dryer is between about 0.1 and 15 minutes, preferably between about 0.5 and 5 minutes.

Further objects, features and advantages of the present invention will become apparent from the detailed description of preferred embodiments which follows.

DETAILED DESCRIPTION OF PREFERRED EMBODIMENTS

According to the invention, solid, anhydrous or hydrated oxides or hydroxides are reacted in an intensive mixing apparatus, directly with hydrogen peroxide, possibly with cooling and transporting the reaction mixture directly to a rapid dryer for the drying process.

Although a process, not previously published (German Patent Application No. P 29 18 137) already exists for the preparation of alkali metal or alkaline earth metal peroxides wherein the spray drying process is used for the drying of the reaction mixture, this process does not employ solid oxides or hydroxides, but initially prepares an oxide or hydroxide suspension, which is then reacted with $H_2O_2$.

In view of the state of the art, it was surprising to find that solid oxides and/or hydroxides may be converted on an industrial scale directly with hydrogen peroxide in a simple process, without incurring heavy losses of active oxygen.

All commercially available solid, anhydrous or hydrated metal oxides or hydroxides may be used, wherein naturally the intended later use of the peroxide determines the choice of the raw material to be employed. Thus, it is necessary to select the purity of the initial raw material accordingly, if the peroxides to be prepared are intended for utilization in the human or veterinary fields.

A commercially available hydrogen peroxide may be used, which may also contain known stabilizers of active oxygen. It is preferred to select an $H_2O_2$ concentration of from about 30 to 70% by weight.

According to the process of the invention, both of the reactants are fed continuously, directly into the intensive mixing apparatus, where they are immediately processed into a homogeneous mixture, while simultaneously reacting with each other.

Devices making possible the rapid, intensive mixing of the two reactants are employed as the intensive mixing apparatus. Particularly suitable is, for example, a rapidly rotating excentric pump, which provides good homogenization, while also transporting the reaction mixture. But, for example, a plough share mixer, in combination with conveying means for transporting the reaction mixture, may also be used. To remove part of the heat of solution and reaction heat, the mixing apparatus may be equipped with a cooling jacket.

One possible embodiment of operation consists of feeding the solid material by means of a conveyor screw equipped with a hollow shaft into the intensive mixer and conducting the hydrogen peroxide through the hollow shaft into the mixer, so that the two reactants are combined only inside the mixer and then processed into a homogeneous mixture.

The continuously introduced streams of material are coordinated with one another so that the reactants are added preferably in an approximately stoichiometric ratio, i.e., with deviations of about ±20 mole % from the proportions according to the reaction equation. It is possible, however, to deviate further from the stoichiometric proportions. If, for example, products with a definite, low active oxygen content are to be produced, it may be advantageous to prepare this product directly by deviating from the stoichiometric proportion, rather than producing a more highly concentrated product which would result from maintaining the stoichiometric proportion and which subsequently must be adjusted to the active oxygen content desired by means of dilution with inert substances.

The mixture leaving the intensive mixing apparatus is transported directly into a rapid dryer, wherein, optionally, means to equalize the product flow, for example, a surge vessel, may be provided. A particularly preferred process operates in a manner so that the average retention time of the material stream, i.e., the mixture of the reactant components and/or the reaction products in the region between their entry into the intensive mixing apparatus and their entry in the rapid dryer, amounts to from about 0.1 to 15 minutes and more preferably from about 0.5 to 5 minutes.

As the rapid dryer, drying apparatuses are used which are capable of drying the continuous stream of material without extensive thermal stress. Drying temperature are adjusted in accordance with the throughput and the specific peroxide.

The use of spray dryers has been found to be well suited for this purpose, with spray dryers having centrifugal atomizers being preferable. For this type of dryer, the reaction mixture to be dried should be within the range of easily pumpable to just still pumpable. For reaction mixtures with a higher solids content, a flash dryer may be used with advantage.

The following advantages are characteristic of the process according to the invention, with respect to the state of the art:

(a) By introducing the reactants in their approximate stoichiometric proportions and by working with concentrated reaction mixtures, the proportion of the ballast to be carried along (water, excessive amounts of a reactant) may be kept extremely low.

(b) The direct spray drying of the reaction mixture eliminates costly separation and purifying stages. In addition, the product is obtained directly as a free flowing powder, and no final treatment in a subsequent comminution installation is necessary.

(c) The process operates continuously.

(d) By virtue of the short reaction period, losses due to the decomposition of active oxygen may be reduced.

(e) By utilizing the heat of solution and the heat of reaction, at least part of the energy otherwise required for drying may be saved.

(f) The process is extremely safe for the environment, since practically no waste water is produced.

The product obtained by the process according to the invention is similarly characterized by advantages with respect to the state of the art:

(a) The prevention of local decomposition reactions insures a good homogeneity of the product.

(b) Spray drying provides good flowability, uniform crystal structures and a narrow, uniform grain size distribution.

Several embodiments of the process according to the present invention are illustrated by the examples which follow hereinafter; however, these examples are merely illustrative and in no sense are to be considered as limiting.

EXAMPLE 1

From a solid reservoir, 84 kg/h of a $Ba(OH)_2.H_2O$ powder are fed continuously by means of a conveyor screw into an intensive mixing apparatus. Simultaneously, from a $H_2O_2$ reservoir, 36.8 l/h of a 39.2% by weight $H_2O_2$ solution (stabilized with 300 mg $PO_4^{3-}$/l) are introduced continuously into the intensive mixing apparatus through the hollow shaft of the conveyor screw. As the intensive mixing apparatus, a mixer pump (Supraton $^R$207) is used. A barium peroxide suspension is formed, with the release of heat. This suspension is transported immediately by way of an inserted equalizing or surge vessel, serving to equalize the product flow exiting intermittently from the mixer pump, to the centrifugal atomizer of a spray dryer. Drying temperatures are adjusted to the constant product flow and amount at the dryer inlet to 300° C. and at the outlet of the dryer to 80°–90° C. The product obtained (75,8 kg/h) contains 92.3% by weight $BaO_2$ and has an average particle diameter of approximately 5 μm. The average retention time of the reaction mixture between entry into the intensive mixing apparatus and entry into the rapid dryer amounts to 2.5 min.

Further experiments are carried out as described in Example 1. The different process parameters and the results of the experiments may be found in the table hereinbelow.

Abbreviations in the table have the following significance:

TABLE

| Example | 2 | 3 | 4 | 5 |
|---|---|---|---|---|
| Solid | MgO | $Ca(OH)_2$ | $Sr(OH)_2$ 8 $H_2O$ | ZnO |
| Kg Solid/h | 11.6 | 47.2 | 92.4 | 38.8 |
| l $H_2O_2$/h | 21 | 52.9 | 28.9 | 39.3 |
| DT-inlet | 250 | 250–300 | 250–300 | 250 |
| DT-outlet | 110–120 | 110–120 | 50 | 110–120 |
| Product Type | $MgO_2$ (45%) | $CaO_2$ (75%) | $SrO_2.H_2O$ (92.2%) | $ZnO_2$ (67.4%) |
| kg/h | 16.1 | 46.2 | 47.9 | 43.8 |
| $D_a$ | 10 μm | 5 μm | 5 μm | 0.5 μm |
| $rt_a$ | 1 min. | 2 min. | 2.5 min. | 1.5 min. |

DT dryer temperature in °C.
$D_a$ average particle diameter
$rt_a$ average retention time
% % by weight

What is claimed is:

1. A continuous process for the production of bivalent metal peroxides, comprising the steps of:
   introducing into an intensive mixing apparatus a solid, anhydrous or hydrated oxide or hydroxide of a bivalent metal;
   simultaneously introducing into the intensive mixing apparatus a solution of hydrogen peroxide, whereby the solid bivalent metal compound and the peroxide are intensively mixed and react to produce a reaction mixture containing bivalent metal peroxide;

transporting the reaction mixture directly to a rapid dryer; and rapidly drying the reaction mixture to produce the bivalent metal peroxide in solid form.

2. A process according to claim 1, wherein the bivalent metal comprises a metal of Group II of the Periodic System.

3. A process according to claim 2, wherein the bivalent metal comprises an alkaline earth metal.

4. A process according to claim 2, wherein the bivalent metal comprises zinc.

5. A process according to claim 1, wherein the average residence time for the reactants between entry into the intensive mixing apparatus and entry into the rapid dryer is between about 0.1 and 15 minutes.

6. A process according to claim 5, wherein said average residence time is between about 0.5 and 5 minutes.

7. A process according to claim 1, wherein the hydrogen peroxide comprises an aqueous solution having a content of from about 30 to 70% by weight of $H_2O_2$.

8. A process according to claim 1, wherein the metal oxide and/or hydroxide is introduced in an approximately stoichiometric proportion with respect to the $H_2O_2$.

9. A process according to claim 1, wherein the rapid dryer comprises a spray dryer.

10. A process according to claim 9, wherein the spray drier includes a centrifugal atomizer.

11. A process according to claim 1, wherein the rapid dryer comprises a flash dryer.

12. A process according to claim 1, further comprising the step of cooling the reaction mixture in the intensive mixing apparatus.

13. A process according to claim 1, wherein the rapid dryer comprises a dryer capable of essentially instantaneously drying the reaction mixture and the drying step comprises essentially instantaneously drying the reaction mixture in the rapid dryer.

14. A process according to claim 1, wherein the drying step comprises dividing the reaction mixture up into fine particles and drying the reaction mixture in fine particulate form.

15. A process according to claim 14, wherein the drying step comprises spray drying the reaction mixture.

16. A process according to claim 1, consisting essentially of the recited steps.

17. A process according to claim 1, wherein said introducing step comprises introducing a solid, anhydrous oxide or hydroxide of a bivalent metal.

* * * * *